Feb. 8, 1949. H. W. HOUSTON 2,461,058
CAMERA DOLLY
Filed March 1, 1947 2 Sheets-Sheet 1

INVENTOR
HERBERT W. HOUSTON
BY Mason & Graham
ATTORNEYS

Feb. 8, 1949.  H. W. HOUSTON  2,461,058
CAMERA DOLLY

Filed March 1, 1947  2 Sheets-Sheet 2

INVENTOR
HERBERT W. HOUSTON
BY
ATTORNEYS

Patented Feb. 8, 1949

2,461,058

UNITED STATES PATENT OFFICE 2,461,058

CAMERA DOLLY

Herbert W. Houston, Sherman Oaks, Calif., assignor to The Houston Corporation, Los Angeles, Calif., a corporation of California Application March 1, 1947, Serial No. 731,880

6 Claims. (Cl. 248—129)

1

The present invention relates to a camera dolly, and more particularly to a camera dolly which is designed for general motion picture studio use.

Various types of camera dollies and cranes have been designed wherein a motion picture cameraman and his camera may be transported horizontally as well as throughout a limited vertical range for certain phases of motion picture photography. Most of such devices, however, are cumbersome, unsteady, and difficult to transport from one location to another. Furthermore, they are limited as to their maneuverability, particularly when near the ground or floor level, so that low angle shots frequently are difficult to secure without the use of special equipment.

An object of the present invention is to make an improved and simplified motion picture camera dolly.

Another object is to make an improved transportable camera support wherein a cameraman and his camera are mounted pivotally on a transportable structure so that vertical, horizontal and pivotal movement of the camera and cameraman can be easily controlled in conformance with the usual requirements of motion picture studio use.

Another object is to make an improved camera dolly wherein horizontal and vertical transportation of a motion picture camera can be accomplished by an assistant under direction of a cameraman on the dolly, and pivotal movement of the camera and cameraman may be accomplished by the cameraman.

Another object is to make a vertically and horizontally movable mount for motion picture camera use, a camera and cameraman being pivotally mounted as a unit on friction controlled mechanism operated by the feet of the cameraman, so as to leave his hands free for the operation of his camera.

Another object is to make an improved pivotal support for a motion picture camera, wherein pivotal movement is controlled by the cameraman through frictionally actuated adjustable pedals.

These and other objects of the invention will be set forth more fully in the following description and the accompanying drawings, of which there are two sheets. In the drawings:

Fig. 1 is a view in side elevation of a motion picture camera dolly embodying the present invention, a portion of the housing and of a vertically movable camera mount being broken away to disclose structural features;

2

Figure 1:
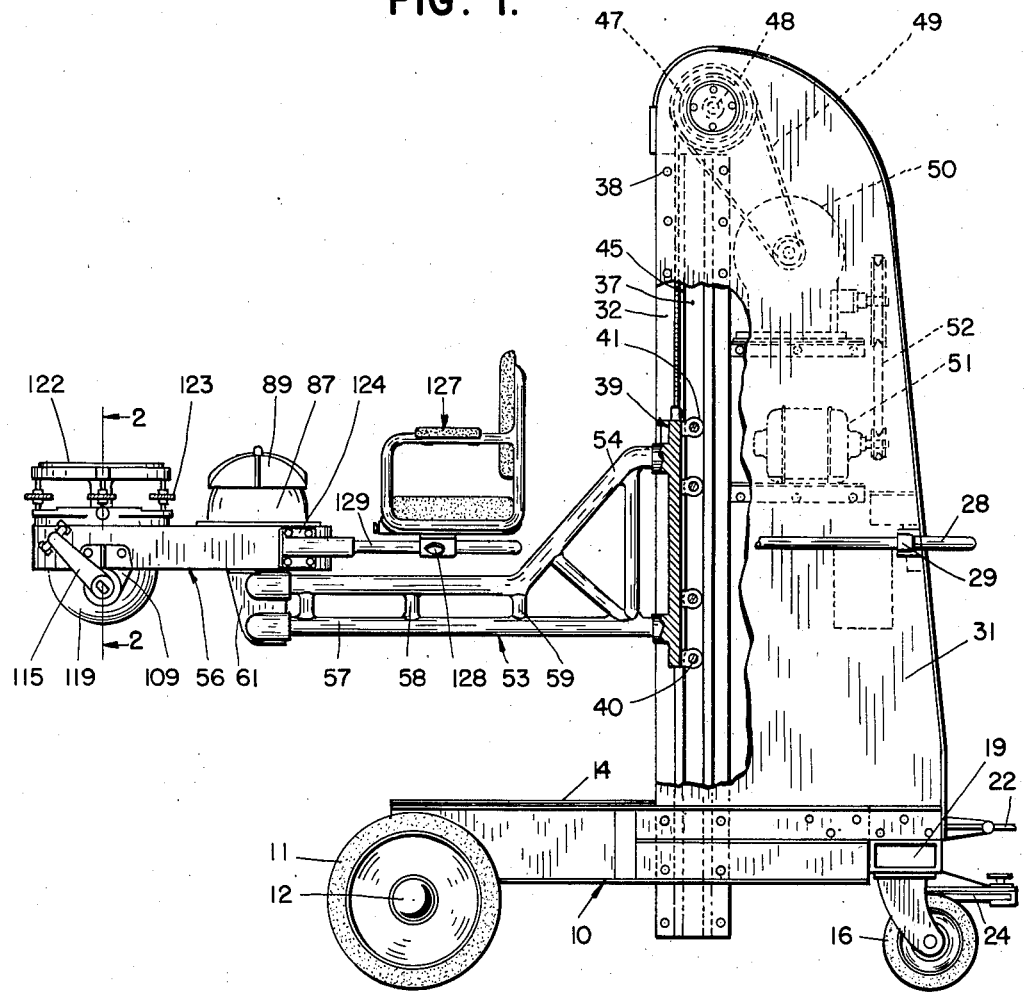
Figure 2:
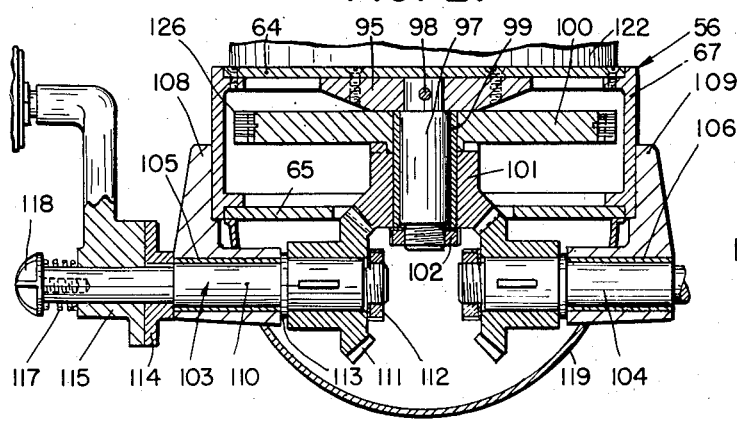
Fig. 2 is an enlarged, fragmentary, sectional view taken on the line 2—2 of Fig. 1.
Figure 3:
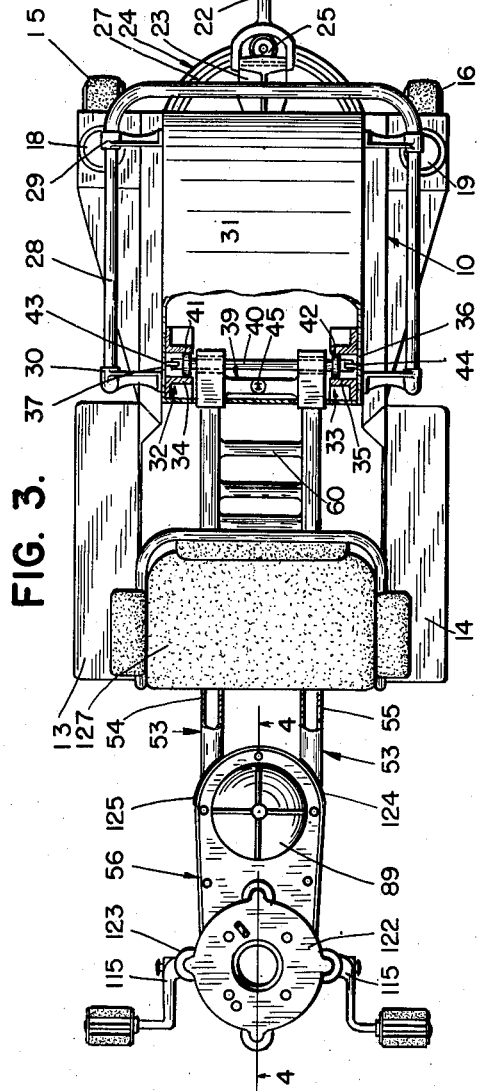
Fig. 3 is a plan view of the structure shown in Fig. 1, an upper portion of a rear housing being broken away.

Referring to the drawings in detail, a base 10 may be of channel iron frame construction, with a pair of front wheels 11, pivoted on a stationary axle 12, mounted beneath step plates 13 and 14 (see Figs. 1 and 3).

A pair of castored rear wheels 15 and 16 are mounted in pivotal supports 18 and 19 respectively, which in turn are mounted on the base. The castored rear wheels are connected by lever and drag link mechanism of an ordinary type (not illustrated) to a towing and steering handle 22. A locking arm 23, connected to turn with the rear wheels, is mounted concentrically with the handle 22, and is arranged to slide on an arcuate guide 24. The rear wheels 15, 16 may be locked in adjusted angular position by a clamp screw 25 which is inserted in an opening in the arm 23, and rides in an arcuate slot 27 in the guide 24. A hand rail 28 is mounted in brackets 29 and 30 secured to the sides of a housing 31.

A pair of vertical channeled guides 32 and 33 are constructed of pairs of oppositely disposed angle irons 34 and 35, which are secured to mounting plates 36, 37 as by screws 38. An elevating frame support member 39 which may be of cast metal such as iron or aluminum, has a plurality of guide roller support rods 40 mounted transversely thereon.

Guide rollers 41 and 42, of a size to fit within the vertical guide channels 32, are journaled on the rods 40. End guide rollers 43 and 44 are pivoted in bifurcating notches in the ends of each of these rods to bear on the plates 36 and 37 which form the bottoms of the guide channels.

A flexible hoisting member 45, such as a length of silent chain, is secured to extend upwardly from the top of the elevating frame support 39, and is wrapped around and secured to a winch drum 47. The drum 47 is keyed to a shaft 48 which is driven, as by means of a silent chain 49, from a speed reducing mechanism 50. The speed reducing mechanism in turn is driven from a motor 51 as by means of a V belt 52. Suitable reversing mechanism is provided to permit selectively raising and lowering the support 39. Such reversing mechanism may comprise a reversing switch in the circuit of the motor 51 or mechanical reversing mechanism associated with the speed reducer 50. Since such reversing devices are well known, it is considered unnecessary to describe the reversing mechanism in detail.

Figure 4:
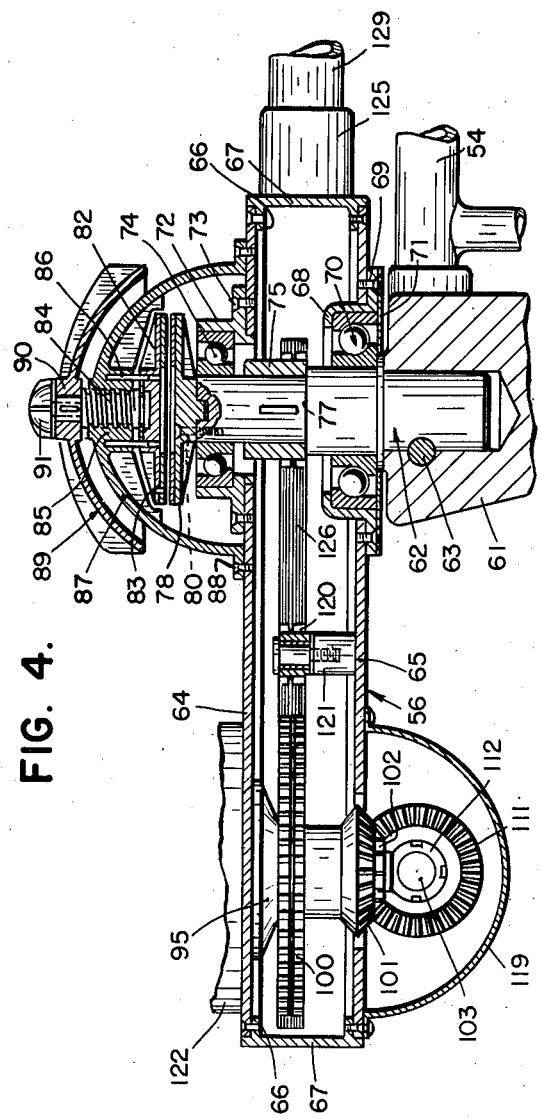
Fig. 4 is an enlarged fragmentary sectional view taken on the line 4—4 of Fig. 3.

An elevating frame 53, comprising offset tubular top members 54 and 55 and horizontal tubular bottom members 57 are mounted to extend laterally from the elevating frame support 39. The tubular top frame members 44 and 45 are connected to their respective lower members 57 by welding upright bracing tubes 58 and 59 therebetween to provide a pair of strong trussed side members. The side frame members thus formed then are secured to each other by welding horizontal bracing tubes 60 between them (see Fig. 3). The outer ends of the tubular side frame members 54, 55 and 57 are inserted in socketed openings in a pivot post support member 61 (see Figs. 1 and 4).

A vertical pivot post 62 is inserted in an opening in the upper end of the pivot post support member 61. The pivot post is secured in anchored position in the member 61 as by means of a transverse pin 63.

An elongated housing 56 comprises top and bottom plates 64 and 65 with a cast metal side enclosure 67 which is continuous around the marginal edges of the top and bottom plates. Inwardly projecting flanges 66 are provided adjacent the top and bottom edges of the side enclosure to position the top and bottom plates 64 and 65 flush with the upper and lower edges of the side enclosure. A flanged bearing cup 68, secured within an opening in the bottom plate 65 by means of screws 69, provides a recessed seat for a ball thrust bearing 70. The inner race of the bearing 70 fits closely on the pivot post 62. A dust cover 71 of suitable material is secured to the lower plate beneath the ball bearing 70 by the same screws 69 which mount the bearing cup 68.

An upper bearing cup 72 is mounted around an opening in the upper plate 64, and is secured to the upper plate by screws 73. A ball bearing 74 is mounted in this upper cup 72, the inner race of the upper bearing being fitted to a reduced portion of the pivot post 62.

A sprocket 75 of the silent chain type is keyed to the pivot post to seat against a shoulder 77 between the lower portion and a reduced intermediate portion of the pivot post.

A lower friction disc 78 has a downwardly projecting central stud 79 which is adapted to fit closely in a recess in the upper end of pivot post 62. The lower friction disc is secured to the pivot post by screws 80. A facing of suitable friction material, such for example as is used for clutch facings, is secured to the upper face of the disc 78.

A similar but reversely positioned upper friction disc 82 is mounted directly over the lower friction disc 78. This upper friction disc also may have a facing of suitable frictional material. This facing, as well as that on the lower disc 78, may be secured in place as by rivets 83. Shear pins 86, which may be three in number, are inserted in registering holes in a domed housing 87 and the upper friction disc 82 to hold the upper friction disc against rotation relatively to the housing.

A threaded shaft portion 84 extends upwardly from the top of the upper disc 82, and this threaded portion screws into a bushing 85 centrally of the domed housing member 87. The domed housing member is of a size to enclose the friction discs 78 and 82, and is secured to the upper plate 64 of the housing as by screws 88. A domed operating dial 89 for the upper friction disc 82 has a hub portion 90 which is keyed to the reduced upper end of the threaded shaft portion 84. The dial 89 is spaced upwardly from, and is curved substantially concentrically with, the domed housing member 87. A retaining nut 91 is threaded onto the upper end of the threaded shaft portion 84.

A metal plate 95 is secured beneath the top plate 64 at the other end of the elongated housing 56 from the pivot post 62. A downwardly extending stud 97 is secured centrally of the plate 95 by a through pin 98. A bearing sleeve 99 is mounted on the stud 97. A sprocket 100, of the silent chain type, which is considerably larger than the sprocket 75 keyed to the pivot post 62, has bearing on the sleeve 99. This sprocket is supported by, and has endwise splined connection with, a bevel gear 101 which also is journaled on the bearing sleeve 99. The bearing sleeve 99 and the bevel gear 101 are retained in position on the stud 97 by a retaining nut 102.

A pair of pedal shafts 103 and 104 are journaled in bearing sleeves 105 and 106 mounted in bearing brackets 108 and 109 which are secured to the sides of the housing 56. Each of the pedal shafts comprises a relatively large inner end portion 110 to which a bevel pinion 111 is keyed, and is retained in position thereon by a retaining nut 112. A collar 113 is provided on the shaft 103 inwardly of the pinion 111, the collar riding against the inner end of the bearing sleeve 105 and bearing bracket 108.

A flanged collar 114 is keyed to the shaft 103 and has inner end support against an offset shoulder formed between two portions of the shaft 103 having different diameters.

Two pedal assemblies are provided, but since they are similar to each other, one only will be described. A pedal 115 is pivoted on the shaft 103, its hub having a planiform inner face adapted to have frictional engagement with the flanged collar 114. The pedal is slidably mounted on the shaft 103 and is held in frictional engagement with the flanged collar 114 by a coil compression spring 117 which is secured in position by a large dome-headed screw 118.

A domed casing 119 is mounted beneath the housing 56 to enclose the bevel gear and pinion mechanism for transmitting pedal motion to the gear.

An idler take-up sprocket 120 is mounted on a post 121 secured to the housing bottom plate 65, to take up slack in a silent drive chain 126 which passes around the sprockets 75 and 100.

A camera support base 122 having the usual leveling screws 123 thereon is mounted on the forward end of the housing 56. Since this may be a normal type of camera support base, it will be unnecessary to describe it in detail.

A pair of seat supporting, socketed brackets 124 and 125 are secured to the rear of the casing 56 and a U-shaped seat support member 129 which may be of strong tubular material, has the two ends thereof inserted in sockets in these brackets. A seat 127 is mounted to slide longitudinally of the sides of the U-shaped support, the seat being provided with a clamp screw 128 for clamping it in adjusted position.

In operating the device, a camera with suitable accessories is mounted on the supporting base 122, and the cameraman seats himself in the seat 127 and adjusts it longitudinally of its support to suit his preference. The seat then is clamped in adjusted position, and one or more studio employees are stationed behind the device. The controls for elevating and lowering the frame 53 preferably are located so that a studio employee other than the cameraman may operate them.

If the dolly is to be wheeled on a predetermined straight or curved path, the steering handle 22 is adjusted in the desired position and is secured in place by means of the clamp screw 25. Thereafter, by simply pushing the dolly forwardly or rearwardly the wheels will follow the required straight or curved path determined by the setting of the steerable rear wheels 15 and 16.

The cameraman has full control of pivotal movement of the entire assembly mounted on the pivot post 62 by operation of the pedals. It is apparent that a rotation of one of the pedals in one direction, through the differential drive provided by the bevel gears, causes a reverse rotative movement of the other pedal. For this reason it is desirable to permit the cameraman to adjust the relative positions of the pedals by overcoming the frictional engagement between the pedals and the flanged collars 114.

When it is desired to secure the camera in adjusted position, the domed dial 89 may be rotated to screw the upper friction disc 82 downwardly into a desired degree of frictional engagement with the relatively fixed lower friction disc 78. By rotating the control dial 89, frictional engagement between the upper and lower discs 82 and 78 may be balanced against the frictional resistance between the pedals and their flanged collars 114, that the cameraman is able effectively to control the slightest desired manipulation of the camera.

The cameraman may pivot the entire housing 56, including his own seat, as a unit, to a desired angle horizontally. After reaching the desired position and securing the housing in such adjusted position, he is able, by pressing the pedals, to overcome the frictional resistance between the pedals and their flanged collars 114, and thus move the pedals to a desired position for his own comfort. This also assists him in holding the camera steady in an adjusted position, and to return the camera to approximately the previous adjusted position after pivotally moving the housing from such position.

The entire unit of cameraman and camera can be adjusted vertically by operation of the controls by the studio employee who is assigned to manipulate the dolly.

The device comprises a simple, steady, highly flexible and sturdy camera support, capable of use for most types of studio use, and adapted for low angle work without the use of special equipment which would diminish its usefulness.

I claim:

1. A motion picture camera dolly comprising a base, pivoted camera and cameraman support means pivotally mounted on the forward end of said base, controlled brake means operatively mounted between said pivoted support means and said base, differential drive means mounted to operate between the pivoted support means and said base, a pair of pedals pivotally connected to said differential drive means, and resiliently actuated friction drive means interconnecting said pedals in driving relation to said differential means, for controlled pivotal movement of said pivoted support means on an actuation of said pedals.

2. A motion picture camera dolly comprising a base, pivoted camera and cameraman support means pivotally mounted on the forward end of said base, controlled brake means operatively mounted between said pivoted support means and said base, differential drive means mounted to operate between the pivoted support means and said base for controlled pivotal movement of said pivoted support means, said differential drive means comprising a pair of oppositely rotatable shafts incorporated therein, a collar having a friction face thereon secured to each of said shafts, a pedal rotatably mounted on each shaft and having a hub portion with a friction face thereon positioned oppositely to and in substantial registry with the friction face on said collar, and means resiliently urging the registering friction faces of said collars and said pedal hubs into predetermined frictional driving engagement with each other.

3. A motion picture camera dolly comprising a transportable base, a vertical guideway mounted on said base, a camera support frame mounted for vertical movement in said guideway, hoisting mechanism operatively connected to said camera support frame, reversible, adjustable speed, drive mechanism connected to operate said hoisting mechanism, an elongated camera and cameraman support member pivotally mounted on a pivot post fixedly secured to said camera support frame, a camera support mounted on one end of said elongated support member, a cameraman's seat adjustably mounted on the other end of said elongated support member, a first friction disc fixedly mounted on said pivot post, a second disc mounted in axially opposed separated position from said first disc, at least one of said discs being mounted for axial non-rotative movement, controlled actuating means mounted to move said discs into frictional braking engagement with each other, foot pedal means mounted in position to receive and support the feet of a cameraman supported on said elongated support member, and motion transmitting means operatively connected between said pedals and a frame element to rotate said elongated support member relatively to said camera support frame on an actuation of said pedal means.

4. A motion picture camera dolly comprising a transportable base, a vertical guideway mounted on said base, a camera support frame mounted for vertical movement in said guideway, reversible, adjustable speed, drive mechanism connected to operate said camera support frame, an elongated housing pivotally mounted on a pivot post fixedly secured to said camera support frame, a first circular torque transmitting member fixedly secured to said pivot post co-axially therewith, a camera support mounted on one end of said elongated housing, a cameraman's seat mounted on the other end of said housing, a second circular torque transmitting member mounted rotatably in said housing, torque transmitting means operatively interconnecting the first and second torque transmitting circular members, a first friction disc mounted on said pivot post, a second friction disc mounted in axially opposed separated position from said first disc, both of said discs being substantially non-rotative relatively to said housing, and at least one of said discs being mounted for axial movement, controlled actuating means mounted to move said discs into frictional braking engagement with each other, foot pedal means mounted in position to receive and support the feet of a cameraman on said seat, and motion transmitting means operatively connected between said pedals and said rotatable torque transmitting member to rotate said elongated housing member on an actuation of said pedal means.

5. A motion picture camera dolly comprising a transportable base, a camera support frame mounted for vertical movement on said base, reversible, adjustable speed, drive mechanism connected to operate said camera support frame, an elongated camera and cameraman support housing pivotally mounted on said camera support frame, a first circular torque transmitting member fixedly secured relatively to said camera support frame, a second circular torque transmitting member mounted rotatably in said housing, torque transmitting means operatively interconnecting the first and second torque transmitting circular members, foot pedal means operatively mounted on said housing, and motion transmitting means operatively connected between said pedals and said second circular torque transmitting member to rotate said elongated housing on an actuation of said pedal means.

6. A motion picture camera dolly comprising a transportable base, a camera support frame mounted on the base, camera and cameraman support means pivoted on the forward end of said camera support frame, a camera support mounted adjacent one end of said pivoted support means, a cameraman's seat mounted adjacent the other end of said pivoted support means, a pair of foot pedals rotatably mounted in position to receive and support the feet of a cameraman seated in said seat, differential motion transmitting means operatively mounted to rotate said frame on an actuation thereof, and frictional drive means interconnecting said foot pedals and said differential motion transmitting means, the degree of frictional interconnection being less than the normal foot power of an operator available to overcome said frictional interconnection.

HERBERT W. HOUSTON.

REFERENCES CITED

The following references are of record in the file of this patent:

UNITED STATES PATENTS

| Number | Name | Date |
|---|---|---|
| 1,855,964 | Higginbotham | Apr. 26, 1932 |
| 2,073,998 | Raby | Mar. 16, 1937 |
| 2,211,088 | Arnold | Aug. 13, 1940 |
| 2,224,901 | Cunningham | Dec. 17, 1940 |
| 2,358,105 | Scott-Paine | Sept. 12, 1944 |